(12) United States Patent
Seeger et al.

(10) Patent No.: US 8,141,424 B2
(45) Date of Patent: Mar. 27, 2012

(54) LOW INERTIA FRAME FOR DETECTING CORIOLIS ACCELERATION

(75) Inventors: Joseph Seeger, Menlo Park, CA (US); Bruno Borovic, San Francisco, CA (US)

(73) Assignee: Invensense, Inc., Sunnyvale, CA (US)

( * ) Notice: Subject to any disclaimer, the term of this patent is extended or adjusted under 35 U.S.C. 154(b) by 535 days.

(21) Appl. No.: 12/210,045

(22) Filed: Sep. 12, 2008

(65) Prior Publication Data

US 2010/0064805 A1   Mar. 18, 2010

(51) Int. Cl.
*G01C 19/56* (2006.01)
(52) U.S. Cl. .................. 73/504.12; 73/504.14
(58) Field of Classification Search ............... 73/504.12, 73/504.04, 504.02, 504.13, 504.14, 504.15, 73/493
See application file for complete search history.

(56) References Cited

U.S. PATENT DOCUMENTS

| | | | |
|---|---|---|---|
| 4,510,802 A * | 4/1985 | Peters | 73/504.12 |
| 4,601,206 A | 7/1986 | Watson | |
| 4,736,629 A | 4/1988 | Cole | |
| 4,783,742 A | 11/1988 | Peters | |
| 4,841,773 A | 6/1989 | Stewart | |
| 5,251,484 A | 10/1993 | Mastache | |
| 5,349,858 A | 9/1994 | Yagi et al. | |
| 5,359,893 A | 11/1994 | Dunn | |
| 5,367,631 A | 11/1994 | Levy | |
| 5,415,040 A | 5/1995 | Nottmeyer | |

(Continued)

FOREIGN PATENT DOCUMENTS

EP   0429391   8/1995

(Continued)

OTHER PUBLICATIONS

Oboe, R., Lasalandra, E., White, M. M. MEMS-based Accelerometers and their Application to Vibration Suppression in Hard Disk Drives. MEMS/NEMS Handbook Techniques and Applications vol. 4, Springer 2006, pp. 1-29 see pp. 7-22.

(Continued)

*Primary Examiner* — Helen C. Kwok
(74) *Attorney, Agent, or Firm* — Sawyer Law Group, P.C.

(57) ABSTRACT

A sensing frame that moves in response to torque generated by the Coriolis acceleration on a drive subsystem is disclosed. The sensing frame include a first rail. The first rail is constrained to move along the first axis parallel to the first rail. The frame includes a second rail substantially parallel to said first rail. The second rail is constrained to move along the first axis. The frame includes a base and at least two guiding arms for ensuring that the first rail and the second rail move in anti-phase fashion along the first axis. A first guiding arm is flexibly coupled to the first rail and flexibly coupled to the second rail and a second guiding arm is flexibly coupled to the first rail and flexibly coupled to the second rail. The first guiding arm is flexibly suspended to the base at a first anchoring point for allowing rotation of the first guiding arm around the second axis that is perpendicular to the first axis and normal to the plane, and the second guiding arm is suspended to the base at a second anchoring point allowing rotation of the second guiding arm around the third axis parallel to the second axis. The sensing frame includes a plurality of coupling flexures connecting said sensing frame to the drive subsystem and a transducer for sensing motion of the first and second rails responsive to said angular velocity.

7 Claims, 12 Drawing Sheets

U.S. PATENT DOCUMENTS

| | | | |
|---|---|---|---|
| 5,433,110 A | 7/1995 | Gertz et al. | |
| 5,440,326 A | 8/1995 | Quinn | |
| 5,444,639 A | 8/1995 | White | |
| 5,511,419 A | 4/1996 | Dunn | |
| 5,541,860 A | 7/1996 | Takei et al. | |
| 5,574,221 A | 11/1996 | Park et al. | |
| 5,629,988 A | 5/1997 | Burt et al. | |
| 5,635,638 A | 6/1997 | Geen | |
| 5,635,639 A | 6/1997 | Greiff et al. | |
| 5,698,784 A | 12/1997 | Hotelling | |
| 5,703,293 A | 12/1997 | Zabler et al. | |
| 5,703,623 A | 12/1997 | Hall et al. | |
| 5,734,373 A | 3/1998 | Rosenberg et al. | |
| 5,780,740 A | 7/1998 | Lee et al. | |
| 5,825,350 A | 10/1998 | Case, Jr. | |
| 5,895,850 A | 4/1999 | Buestgens | |
| 5,898,421 A | 4/1999 | Quinn | |
| 5,955,668 A | 9/1999 | Hsu et al. | |
| 5,992,233 A | 11/1999 | Clark | |
| 5,996,409 A | 12/1999 | Funk et al. | |
| 6,067,858 A | 5/2000 | Clark et al. | |
| 6,122,961 A | 9/2000 | Geen et al. | |
| 6,134,961 A | 10/2000 | Touge et al. | |
| 6,158,280 A | 12/2000 | Nonomura | |
| 6,168,965 B1 | 1/2001 | Malinovich et al. | |
| 6,189,381 B1 | 2/2001 | Huang et al. | |
| 6,230,564 B1 | 5/2001 | Matsunaga et al. | |
| 6,250,156 B1 | 6/2001 | Seshia et al. | |
| 6,250,157 B1 | 6/2001 | Touge | |
| 6,269,254 B1 | 7/2001 | Mathis | |
| 6,279,043 B1 | 8/2001 | Hayward et al. | |
| 6,292,170 B1 | 9/2001 | Chang et al. | |
| 6,343,349 B1 | 1/2002 | Braun et al. | |
| 6,370,937 B2 | 4/2002 | Hsu | |
| 6,374,255 B1 | 4/2002 | Peurach et al. | |
| 6,386,033 B1 | 5/2002 | Negoro | |
| 6,391,673 B1 | 5/2002 | Ha et al. | |
| 6,393,914 B1 | 5/2002 | Zarabadi et al. | |
| 6,424,356 B2 | 7/2002 | Chang et al. | |
| 6,429,895 B1 | 8/2002 | Onuki | |
| 6,430,998 B2 | 8/2002 | Kawai et al. | |
| 6,480,320 B2 | 11/2002 | Nasiri | |
| 6,481,283 B1 | 11/2002 | Cardarelli | |
| 6,481,284 B2 | 11/2002 | Geen et al. | |
| 6,481,285 B1 | 11/2002 | Shkel et al. | |
| 6,487,369 B1 | 11/2002 | Sato | |
| 6,487,908 B2 | 12/2002 | Geen et al. | |
| 6,494,096 B2 | 12/2002 | Sakai et al. | |
| 6,508,122 B1 | 1/2003 | McCall et al. | |
| 6,508,125 B2 | 1/2003 | Otani | |
| 6,513,380 B2 | 2/2003 | Reeds, III et al. | |
| 6,520,017 B1 | 2/2003 | Schoefthaler et al. | |
| 6,533,947 B2 | 3/2003 | Nasiri et al. | |
| 6,573,883 B1 | 6/2003 | Bartlett | |
| 6,636,521 B1 | 10/2003 | Guillianelli | |
| 6,646,289 B1 | 11/2003 | Badehi | |
| 6,668,614 B2 | 12/2003 | Itakura | |
| 6,720,994 B1 | 4/2004 | Grottodden et al. | |
| 6,725,719 B2 | 4/2004 | Cardarelli | |
| 6,758,093 B2 | 7/2004 | Tang et al. | |
| 6,794,272 B2 | 9/2004 | Turner et al. | |
| 6,796,178 B2 | 9/2004 | Jeong et al. | |
| 6,823,733 B2 * | 11/2004 | Ichinose | 73/504.02 |
| 6,834,249 B2 | 12/2004 | Orchard | |
| 6,843,127 B1 * | 1/2005 | Chiou | 73/504.12 |
| 6,845,669 B2 | 1/2005 | Acar et al. | |
| 6,848,304 B2 | 2/2005 | Geen | |
| 6,859,751 B2 | 2/2005 | Cardarelli | |
| 6,860,150 B2 | 3/2005 | Cho | |
| 6,892,575 B2 * | 5/2005 | Nasiri et al. | 73/504.12 |
| 6,915,693 B2 * | 7/2005 | Kim et al. | 73/504.12 |
| 6,918,297 B2 | 7/2005 | MacGugan | |
| 6,918,298 B2 | 7/2005 | Park | |
| 6,938,484 B2 | 9/2005 | Najafi et al. | |
| 6,939,473 B2 | 9/2005 | Nasiri et al. | |
| 6,952,965 B2 * | 10/2005 | Kang et al. | 73/504.12 |
| 6,955,086 B2 | 10/2005 | Yoshikawa et al. | |
| 6,963,345 B2 | 11/2005 | Boyd et al. | |
| 6,972,480 B2 | 12/2005 | Zilber et al. | |
| 6,981,416 B2 | 1/2006 | Chen et al. | |
| 7,004,025 B2 | 2/2006 | Tamura | |
| 7,028,546 B2 | 4/2006 | Hoshal | |
| 7,028,547 B2 | 4/2006 | Shiratori et al. | |
| 7,036,372 B2 | 5/2006 | Chojnacki et al. | |
| 7,040,163 B2 | 5/2006 | Shcheglov et al. | |
| 7,040,922 B2 | 5/2006 | Harney et al. | |
| 7,057,645 B1 | 6/2006 | Hara et al. | |
| 7,077,007 B2 | 7/2006 | Rich et al. | |
| 7,104,129 B2 | 9/2006 | Nasiri et al. | |
| 7,121,141 B2 | 10/2006 | McNeil | |
| 7,154,477 B1 | 12/2006 | Hotelling et al. | |
| 7,155,975 B2 | 1/2007 | Mitani et al. | |
| 7,158,118 B2 | 1/2007 | Liberty | |
| 7,159,442 B1 | 1/2007 | Jean | |
| 7,168,317 B2 | 1/2007 | Chen | |
| 7,180,500 B2 | 2/2007 | Marvit et al. | |
| 7,196,404 B2 | 3/2007 | Schirmer et al. | |
| 7,210,351 B2 | 5/2007 | Lo et al. | |
| 7,222,533 B2 | 5/2007 | Mao et al. | |
| 7,236,156 B2 | 6/2007 | Liberty et al. | |
| 7,237,437 B1 | 7/2007 | Fedora | |
| 7,239,301 B2 | 7/2007 | Liberty et al. | |
| 7,240,552 B2 | 7/2007 | Acar et al. | |
| 7,243,561 B2 | 7/2007 | Ishigami et al. | |
| 7,247,246 B2 | 7/2007 | Nasiri et al. | |
| 7,250,112 B2 | 7/2007 | Nasiri et al. | |
| 7,258,008 B2 * | 8/2007 | Durante et al. | 73/504.04 |
| 7,258,011 B2 | 8/2007 | Nasiri et al. | |
| 7,260,789 B2 | 8/2007 | Hunleth et al. | |
| 7,262,760 B2 | 8/2007 | Liberty | |
| 7,284,430 B2 | 10/2007 | Acar et al. | |
| 7,289,898 B2 | 10/2007 | Hong et al. | |
| 7,290,435 B2 | 11/2007 | Seeger et al. | |
| 7,299,695 B2 | 11/2007 | Tanaka et al. | |
| 7,325,454 B2 | 2/2008 | Saito et al. | |
| 7,331,212 B2 | 2/2008 | Manlove et al. | |
| 7,333,087 B2 | 2/2008 | Soh et al. | |
| 7,352,567 B2 | 4/2008 | Hotelling et al. | |
| 7,377,167 B2 | 5/2008 | Acar et al. | |
| 7,386,806 B2 | 6/2008 | Wroblewski | |
| 7,395,181 B2 | 7/2008 | Foxlin | |
| 7,414,611 B2 | 8/2008 | Liberty | |
| 7,424,213 B2 | 9/2008 | Imada | |
| 7,437,931 B2 | 10/2008 | Dwyer et al. | |
| 7,442,570 B2 | 10/2008 | Nasiri et al. | |
| 7,454,971 B2 * | 11/2008 | Blomqvist | 73/504.12 |
| 7,458,263 B2 | 12/2008 | Nasiri et al. | |
| 7,508,384 B2 | 3/2009 | Zhang et al. | |
| 7,522,947 B2 | 4/2009 | Tsuda | |
| 7,533,569 B2 | 5/2009 | Sheynblat | |
| 7,549,335 B2 | 6/2009 | Inoue et al. | |
| 7,552,636 B2 | 6/2009 | Datskos | |
| 7,617,728 B2 | 11/2009 | Cardarelli | |
| 7,621,183 B2 | 11/2009 | Seeger et al. | |
| 7,677,099 B2 * | 3/2010 | Nasiri et al. | 73/504.12 |
| 7,677,100 B2 | 3/2010 | Konaka | |
| 7,765,869 B2 | 8/2010 | Sung et al. | |
| 7,779,689 B2 | 8/2010 | Li et al. | |
| 7,783,392 B2 | 8/2010 | Oikawa | |
| 7,784,344 B2 | 8/2010 | Pavelescu et al. | |
| 7,814,791 B2 | 10/2010 | Andersson et al. | |
| 7,907,838 B2 | 3/2011 | Nasiri et al. | |
| 2002/0027296 A1 | 3/2002 | Badehi | |
| 2002/0189351 A1 | 12/2002 | Reeds et al. | |
| 2003/0159511 A1 | 8/2003 | Zarabadi et al. | |
| 2004/0016995 A1 | 1/2004 | Kuo et al. | |
| 2004/0066981 A1 | 4/2004 | Li et al. | |
| 2004/0160525 A1 | 8/2004 | Kingetsu et al. | |
| 2004/0179108 A1 | 9/2004 | Sorek et al. | |
| 2005/0066728 A1 | 3/2005 | Chojnacki | |
| 2005/0110778 A1 | 5/2005 | Ben Ayed | |
| 2005/0212751 A1 | 9/2005 | Marvit et al. | |
| 2006/0017837 A1 | 1/2006 | Sorek et al. | |
| 2006/0032308 A1 | 2/2006 | Acar et al. | |
| 2006/0033823 A1 | 2/2006 | Okamura | |
| 2006/0061545 A1 | 3/2006 | Hughes et al. | |
| 2006/0115297 A1 | 6/2006 | Nakamaru | |

| | | |
|---|---|---|
| 2006/0119710 A1 | 6/2006 | Ben-Ezra et al. |
| 2006/0139327 A1 | 6/2006 | Dawson et al. |
| 2006/0164382 A1 | 7/2006 | Kulas et al. |
| 2006/0164385 A1 | 7/2006 | Smith et al. |
| 2006/0185502 A1 | 8/2006 | Nishitani et al. |
| 2006/0187308 A1 | 8/2006 | Lim et al. |
| 2006/0251410 A1 | 11/2006 | Trutna, Jr. |
| 2007/0035630 A1 | 2/2007 | Lindenstruth et al. |
| 2007/0063985 A1 | 3/2007 | Yamazaki et al. |
| 2007/0113207 A1 | 5/2007 | Gritton |
| 2007/0146325 A1 | 6/2007 | Poston et al. |
| 2007/0167199 A1 | 7/2007 | Kang |
| 2007/0176898 A1 | 8/2007 | Suh |
| 2008/0009348 A1 | 1/2008 | Zalewski et al. |
| 2008/0088602 A1 | 4/2008 | Hotelling |
| 2008/0098315 A1 | 4/2008 | Chou et al. |
| 2008/0134784 A1 | 6/2008 | Jeng et al. |
| 2008/0158154 A1 | 7/2008 | Liberty et al. |
| 2008/0204566 A1 | 8/2008 | Yamazaki et al. |
| 2008/0314147 A1 | 12/2008 | Nasiri et al. |
| 2009/0005975 A1 | 1/2009 | Forstall et al. |
| 2009/0005986 A1 | 1/2009 | Soehren |
| 2009/0043504 A1 | 2/2009 | Bandyopadhyay et al. |
| 2009/0088204 A1 | 4/2009 | Culbert et al. |
| 2009/0326851 A1 | 12/2009 | Tanenhaus |
| 2010/0013814 A1 | 1/2010 | Jarczyk |

FOREIGN PATENT DOCUMENTS

| | | |
|---|---|---|
| WO | 2005/043079 | 12/2005 |
| WO | 2006043890 | 4/2006 |

OTHER PUBLICATIONS

Singh, Amit, "The Apple Motion Sensor as a Human Interface Device," www.kernelthread.com, 1994-2006.

Cho, et al., Dynamics of Tilt-based Browsing on Mobile Devices. CHI 2007, Apr. 28-May 3, 2007, San Jose, California, USA., pp. 1947-1952.

* cited by examiner

10

10'

LOW INERTIA FRAME FOR DETECTING CORIOLIS ACCELERATION

FIELD OF THE INVENTION

The present invention relates to angular velocity sensors, and more particularly to the sensing frame of in-plane angular velocity sensors.

BACKGROUND OF THE INVENTION

Typically a vibratory angular rate sensor comprises drive and sense subsystems. The drive subsystem is driven into oscillation at the resonant frequency of the drive mode. The Coriolis force acts on the oscillating drive subsystem and generated force which is then transferred to the sense subsystem. Consequently, the sense subsystem moves at the drive frequency proportional to the input rate of rotation and that motion is typically sensed by an appropriate transducer.

There are various implementations of these types of sensors. Some sensors may have a plurality sense modes or a single sense mode. In other embodiments, the sense mode may match the drive mode or in another embodiment the sense mode and drive mode may be apart from each other. Vibratory angular velocity sensors have an active mass and a parasitic mass. The active mass is the mass participating in the generation of the Coriolis force while the parasitic mass does not contribute to the generation of the Coriolis force. However, the Coriolis force moves the parasitic mass, and therefore the sensitivity of the angular velocity sensor can be substantially increased if the parasitic mass is minimized.

Accordingly, what is desired is a system and method that addresses the above-identified issues. The system and method should be cost effective, easily implemented and adaptable to existing sensors.

SUMMARY OF THE INVENTION

A sensing frame that moves in response to torque generated by the Coriolis acceleration on a drive subsystem is disclosed. The sensing frame include a first rail. The first rail is constrained to move along the first axis parallel to the first rail. The frame includes a second rail substantially parallel to said first rail. The second rail is constrained to move along the first axis. The frame includes a base and at least two guiding arms for ensuring that the first rail and the second rail move in anti-phase fashion along the first axis. A first guiding arm is flexibly coupled to the first rail and flexibly coupled to the second rail and a second guiding arm is flexibly coupled to the first rail and flexibly coupled to the second rail. The first guiding arm is flexibly suspended to the base at a first anchoring point for allowing rotation of the first guiding arm around the second axis that is perpendicular to the first axis and normal to the plane, and the second guiding arm is suspended to the base at a second anchoring point allowing rotation of the second guiding arm around the third axis parallel to the second axis. The sensing frame includes a plurality of coupling flexures connecting said sensing frame to the drive subsystem and a transducer for sensing motion of the first and second rails responsive to said angular velocity.

DETAILED DESCRIPTION OF PREFERRED EMBODIMENTS

The present invention relates to angular velocity sensors, and more particularly to the sensing frame of the angular velocity sensors. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The purpose of a system and method in accordance with the present invention is to provide an improved sensing frame by reducing an effective mass of said sensing frame. The advantage of reduced inertia is that it improves sensitivity of the angular velocity sensor.

Another advantage of a system and method in accordance with the present invention is to provide the sensing frame which can be suspended to the sensing base at a minimum number of points. Minimizing the number of suspensions improves package sensitivity.

Another advantage of a system and method in accordance with the present invention is to provide a sensing frame having two rails constrained to move linearly in anti-phase fashion. Anti-phase sensing rejects linear acceleration sensitivity of the angular velocity sensor.

Another advantage of a system and method in accordance with the present invention is to provide a universal and flexible sensing frame. The sensing frame can be used with X, Y or Z angular velocity sensor. Also, the sensing frame is easily adjustable in terms of its shape without altering its functionality. The sensing frame can be easily designed so that an angular velocity sensor fits easily onto the substrate with the neighboring MEMS devices. The sensing frame can be easily designed to enclose different drive systems. This substantially reduces the area of the sensor die without degrading performance of the angular velocity sensor.

Figure 1A:
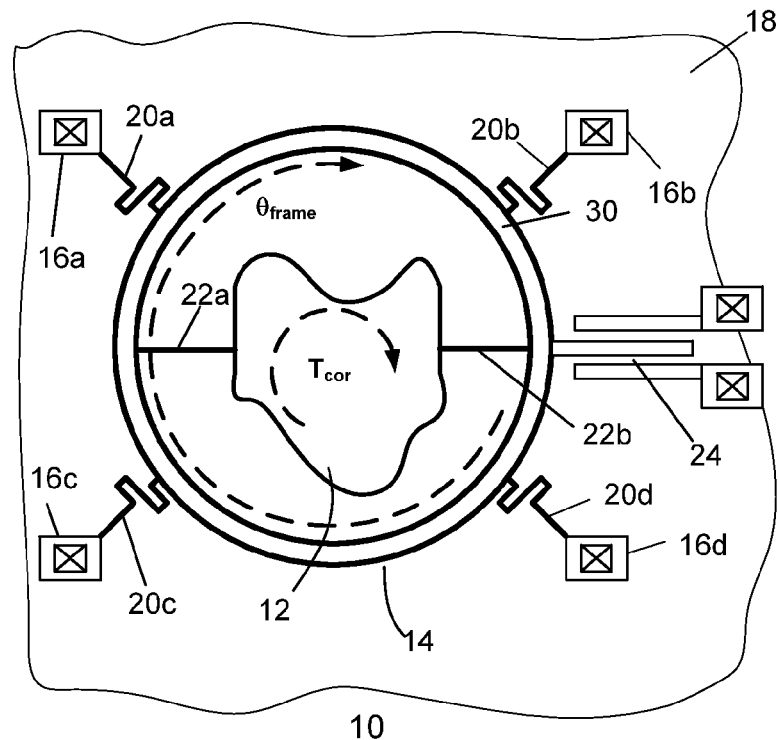
FIG. 1A illustrates an angular velocity sensor with substantially circular sensing frame in accordance with prior art.
Figure 1B:
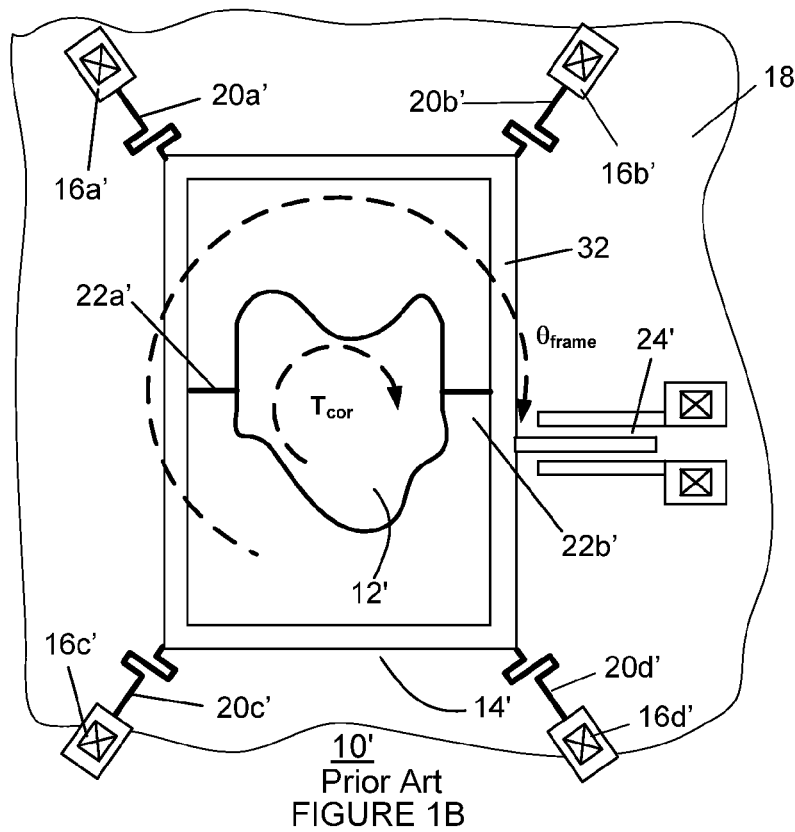
FIG. 1B illustrates a simplified scheme of angular velocity sensor with substantially rectangular sensing frame, in accordance with prior art.

FIG. 1A and FIG. 1B show two embodiments of simplified illustrations of a sensing subassembly for detecting angular velocity as disclosed in U.S. Pat. No. 6,892,575, entitled "X-Y axis dual-mass tuning fork gyroscope with vertically integrated electronics and wafer-scale hermetic packaging," and assigned to the assignee of the present application. In each embodiment, sensing subassembly 10 and 10' comprises a drive subsystem 12 and 12' and a sense subsystem 14 and 14'. In FIG. 1A the rigid sense frame 30 is circular. In FIG. 1B the rigid sense frame 32 is rectangular. The sense subsystem 14 and 14' is suspended to the base 18 at a plurality of anchoring points 16A-16D through a plurality of anchoring flexures 20A-20D. Drive subsystem 12 and 12' may be driven into oscillations based on the fundamental frequency of the drive subsystem 12 and 12'. Coriolis forces may generate a torque on the drive subsystem 12 and 12' as depicted in FIG. 1A and FIG. 1B. Torque is transferred to the sense subsystem 14 and 14' through the coupling flexures 22A-22B that connect drive subsystem 12 and 12' and sense subsystems 14 and 14' causing sense frame 30 and 32 to rotate. Motion of the sense subsystem 14 and 14' is proportional to the input angular velocity and can be sensed by appropriate transducer 24.

Figures 2A, 2B:
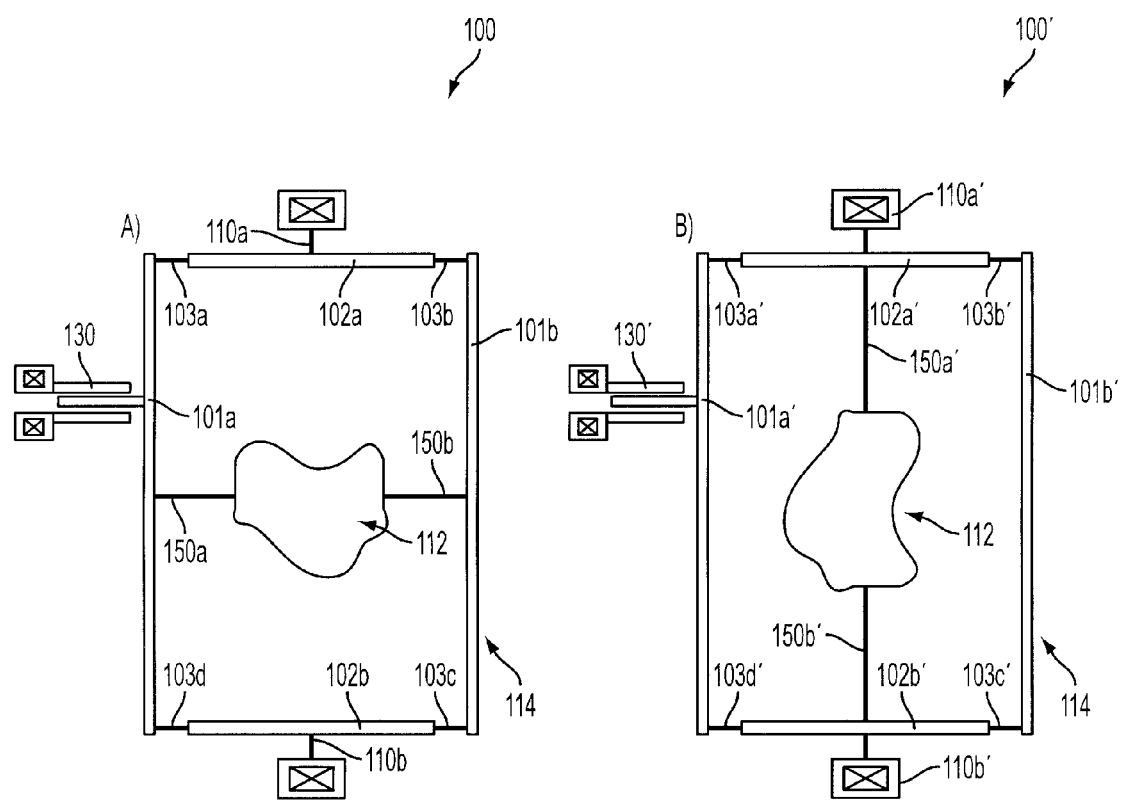
FIG. 2A shows the sensing frame with a drive system that is flexibly coupled to the rails, in accordance with the present invention.
FIG. 2B shows the sensing frame with a drive system that is flexibly coupled to the guiding arms, in accordance with the present invention.

Referring to FIG. 2A and FIG. 2B, a flexible sensing frame is disclosed in accordance with two embodiments. In these embodiments, a sense subsystem 100 and 100' comprises anchoring flexures 110A-110B and a frame further comprising rails 101A-101B and guiding arms 102A-102B. The rails 101A and 101B and guiding arms 102A-102B are flexibly coupled through the four frame flexures 103A-103D. Both rails 101A and 101B and guiding arms 102A-102B are rigid when compared to stiffness of the frame flexures 103A-103D and anchoring flexures 110A-110D. Also, the rails 101A and 101B may support transducer 130. Drive subsystem 112 and the sense subsystem 114 are flexibly connected through the coupling flexures 150A and 150B. In one implementation, the drive subsystem 112 may be connected to the rails 101A and 101B as shown in FIG. 2A. In the other implementation, the drive subsystem 112 may be connected to the guiding arms 102A and 102B as depicted in FIG. 2B.

The frame flexures 103A-103D ensure flexibility of the sensing frame. When torque is applied to the frame through flexures 150A-150B, the sensing frame deforms and assumes the shape of a parallelogram. The anchoring flexures 110A and 110B define pivot points for guiding arms 102A-102B ensuring anti-phase motion of the rails 101A and 101B. The coupling flexures 150A-150B couple the drive subsystem 112 to the sense subsystem 114 and transfer the Coriolis force to the sensing frame. A system and method in accordance with U.S. patent application Ser. No. 12/026,493, entitled Dual Mode Sensing For Vibratory Gyroscope and assigned to the Assignee of the present application, would allow for the coupling flexure 150 to be designed substantially compliant such that the drive subsystem and sense subsystem form two modes with two modal frequencies that are relatively close to each other.

Figure 3:
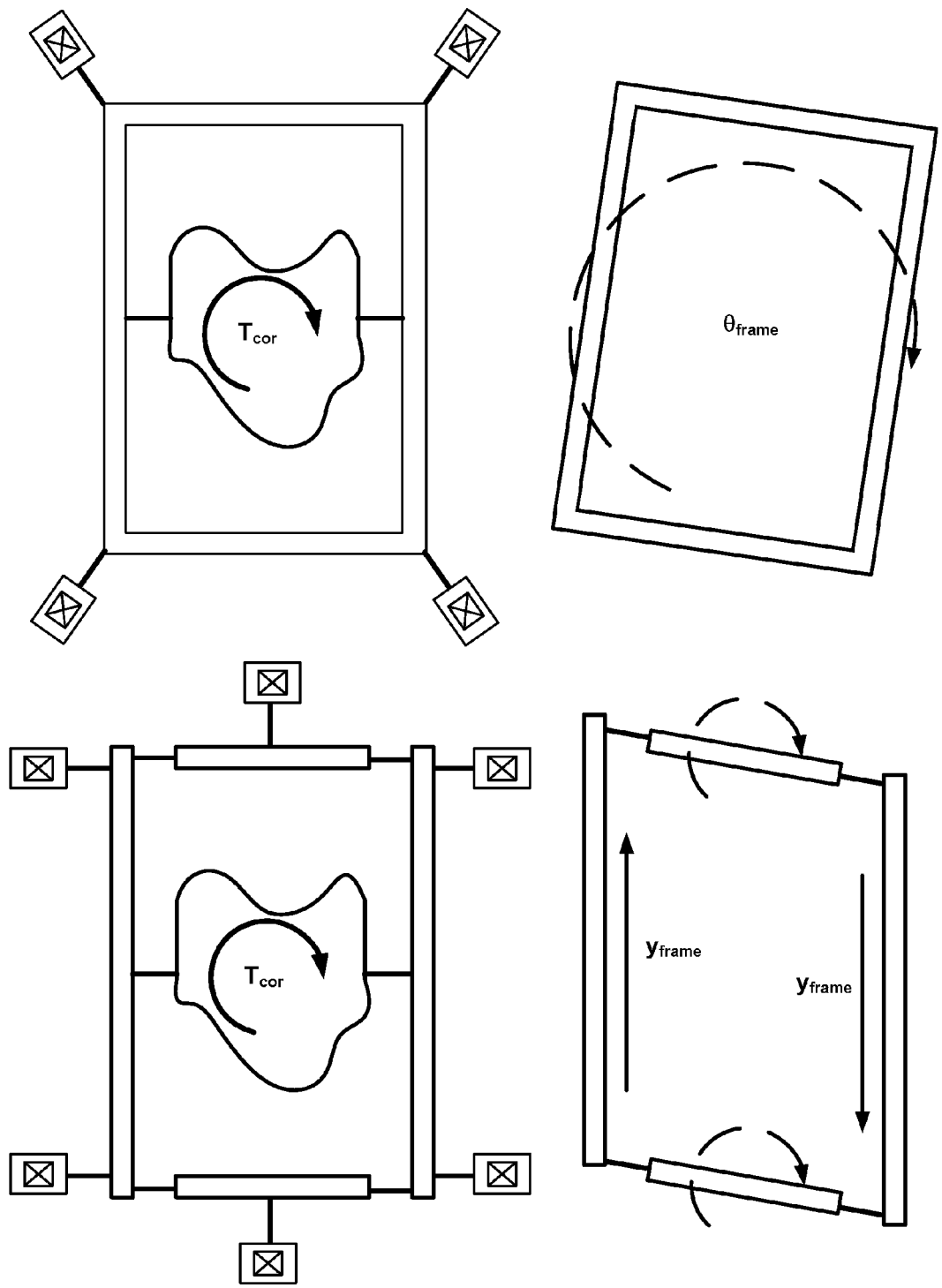
FIG. 3 illustrates the way the inertia of the flexible sensing frame is reduced.

Referring to FIG. 3A and FIG. 3B, the difference in effective moving mass between the stiff and flexible sensing frame is illustrated. FIG. 3A shows the stiff sensing frame rotating about the axis passing through the center of gravity of the frame. The whole frame contributes to the effective moving mass. If, instead of a stiff frame, the flexible sensing frame is used as shown in FIG. 3B, two rails translate along the axis parallel to the plane contributing to the effective moving mass substantially similar as they did in said stiff frame case. However, two guiding arms rotate around their pivot points. Effectively, as each of two rotational axes pass through the center of gravity of each of two guiding arms, their effective moving mass is reduced by an order of magnitude. This substantially reduces the total effective mass of the sensing frame. Reduction in the mass of the sensing frame increases sensitivity of the angular velocity sensor.

Referring to FIG. 4A and FIG. 4B, the advantage of the low-inertia flexible sensing frame on angular rate sensor sensitivity is described. In order to compare the circular frame shown in FIG. 4A and the flexible frame shown in FIG. 4B, the drive system, the generated Coriolis force and the sense frequency are assumed to be the same. The sensitivity of the single-sense-mode angular velocity sensor is proportional to capacitance sensitivity over the combined inertia of the drive and sense subsystems $$S \sim \frac{\partial C}{\partial \theta} \Big/ (I_S + I_D),$$

where $\partial C/\partial \theta$ is total effective rotational capacitance sensitivity, $I_S$ is the equivalent moment of inertia of the frame with transducers and $I_D$ is the equivalent moment of inertia of the drive subsystem.

Translational capacitance sensitivity of one electrode is given as $\partial C/\partial y = \epsilon_C L$, where $\epsilon_C$ is capacitance sensitivity per unit length and L is the length of the transducer. For N electrodes the capacitance sensitivity is given as $(\partial C/\partial y)_N = N\epsilon_C L$. Referring to circular frame in FIG. 4A, the effective frame motion is given as an average of motion at the two sides of the transducer, i.e. $y_{eff} = (R+L/2)\theta$. On the other hand, for the flexible frame from FIG. 4B, the effective frame motion is given as motion of the rails, $y_{eff} = R\theta$. Corresponding rotational capacitance sensitivities are then given as $$\left(\frac{\partial C}{\partial \theta}\right)_c = N\varepsilon_C L\left(R + \frac{L}{2}\right)$$

for the circular frame, and $$\left(\frac{\partial C}{\partial \theta}\right)_f = N\varepsilon_C LR$$

for the flexible frame.

Figure 4:
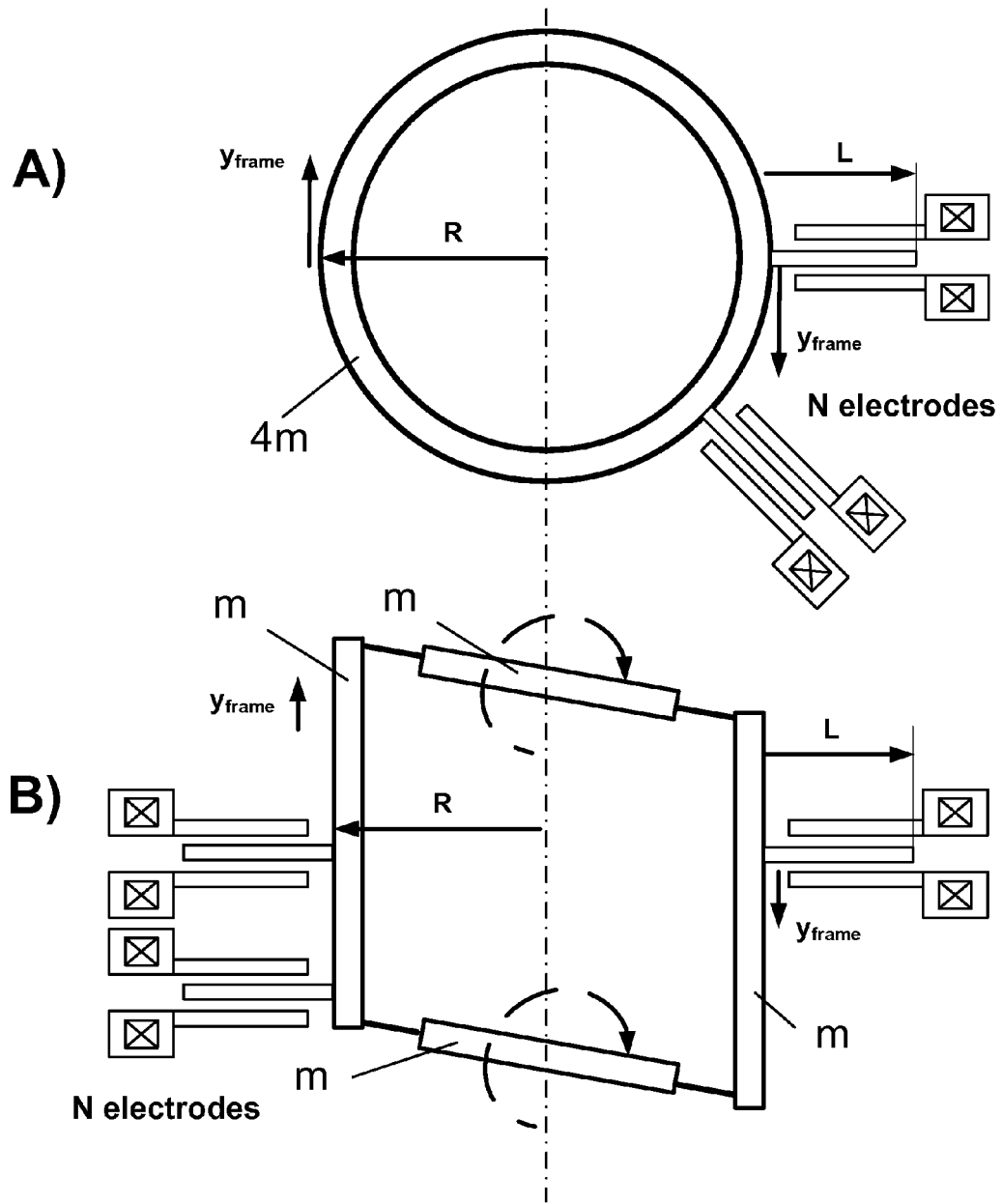
FIG. 4 illustrates in detail the way the inertia of the sensing frame with attached transducers is reduced.

Inertia of both sense subsystems from FIG. 4 is given as a sum of the inertia of the frame and inertia of attached electrodes, $I_S = I_F + I_E$. Inertia of the circular frame from FIG. 4A may be written as $I_{Fc} = 4mR^2$. The inertia of the attached electrodes may be written as $I_{Ec} = N\mu_{ef}L(R^2+RL+L^2/3)$. Total inertia of the circular frame is given as $$I_{Sc} = 4mR^2 + N\mu_{ef}L\left(R^2 + RL + \frac{L^2}{3}\right),$$

where $\mu_{ef}$ is mass of the electrode per unit length and $\mu_{ef}L$ is the mass of the electrode. On the other hand the inertia of the flexible frame may be written as $$I_{Ff} = \frac{8}{3}mR^2$$

and the inertia of the attached fingers may be written as $I_{Ef}=N\mu_{ef}LR^2$. Total inertia of the flexible frame with electrodes is given as $$I_{Sf} = \frac{8}{3}mR^2 + N\mu_{ef}LR^2.$$

Substituting the expressions for capacitance sensitivity and inertia into the equation for sensitivity yields the sensitivity of the circular frame $$S_C \sim \left(\frac{\partial C}{\partial \theta}\right)_c / (I_{Sc} + I_D) = \frac{N\varepsilon_c L\left(R + \frac{L}{2}\right)}{4mR^2 + N\mu_{cf}L\left(R^2 + LR + \frac{L^2}{3}\right) + I_D},$$

and sensitivity of the flexible frame $$S_{Flex} \sim \left(\frac{\partial C}{\partial \theta}\right)_f / (I_{Sf} + I_D) = \frac{N\varepsilon_C LR}{\frac{8}{3}mR^2 + N\mu_{cf}LR^2 + I_D}$$

Figure 5:
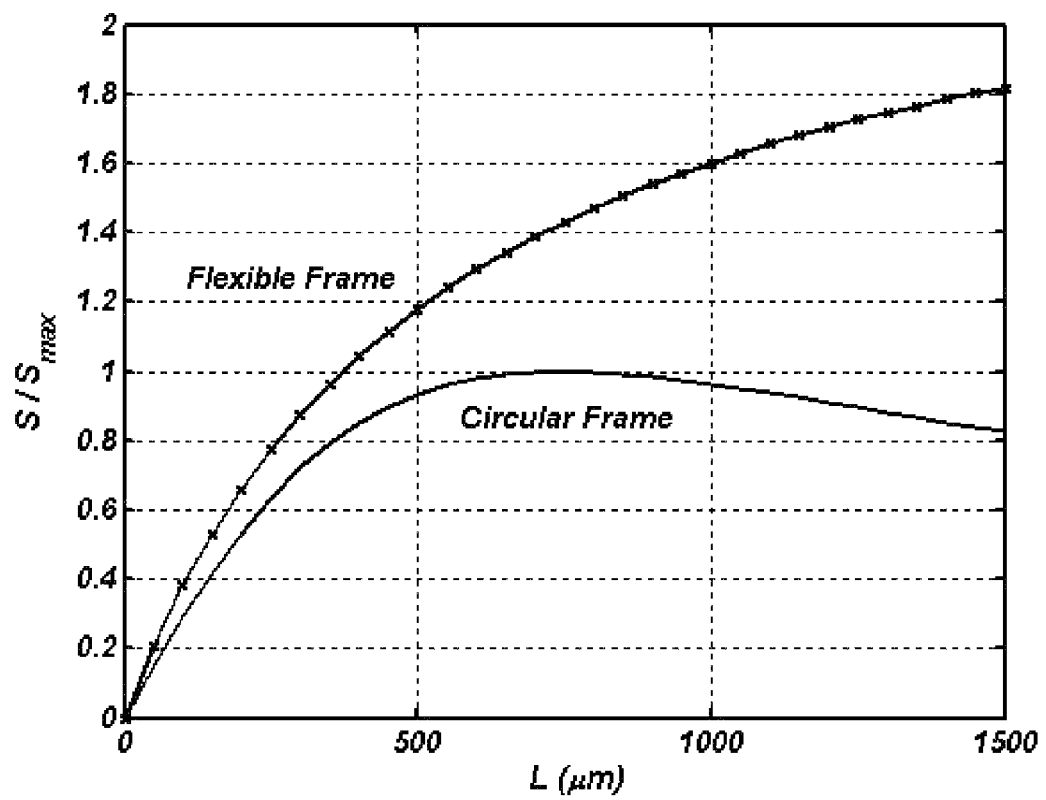
FIG. 5 provides sensitivity of a single mode angular velocity sensor as a function of electrode length.

Sensitivity of both circular and flexible frame as a function of length of the electrode is shown in FIG. 5. The circular frame reaches sensitivity maximum when influence of the moment of inertia becomes dominant over the gain in capacitance sensitivity. Length of the transducers is therefore related to the radius of the circular frame. Flexible frame allows adding longer transducers resulting in increased sensitivity. There are no limits on relation between transducer length and frame geometry. The design of the low inertia frame is therefore more flexible. Furthermore, the addition of more transducers to the circular frame requires increase in the frame radius. On the other hand, the transducers can be added to the low-inertia frame just by extending the length of the rails. Moreover, unlike in the case of the circular frame, the low-inertia frame allows transducers to be attached to the frame parallel with respect to each other. This increases the area density of the capacitance sensitivity.

Figure 6:
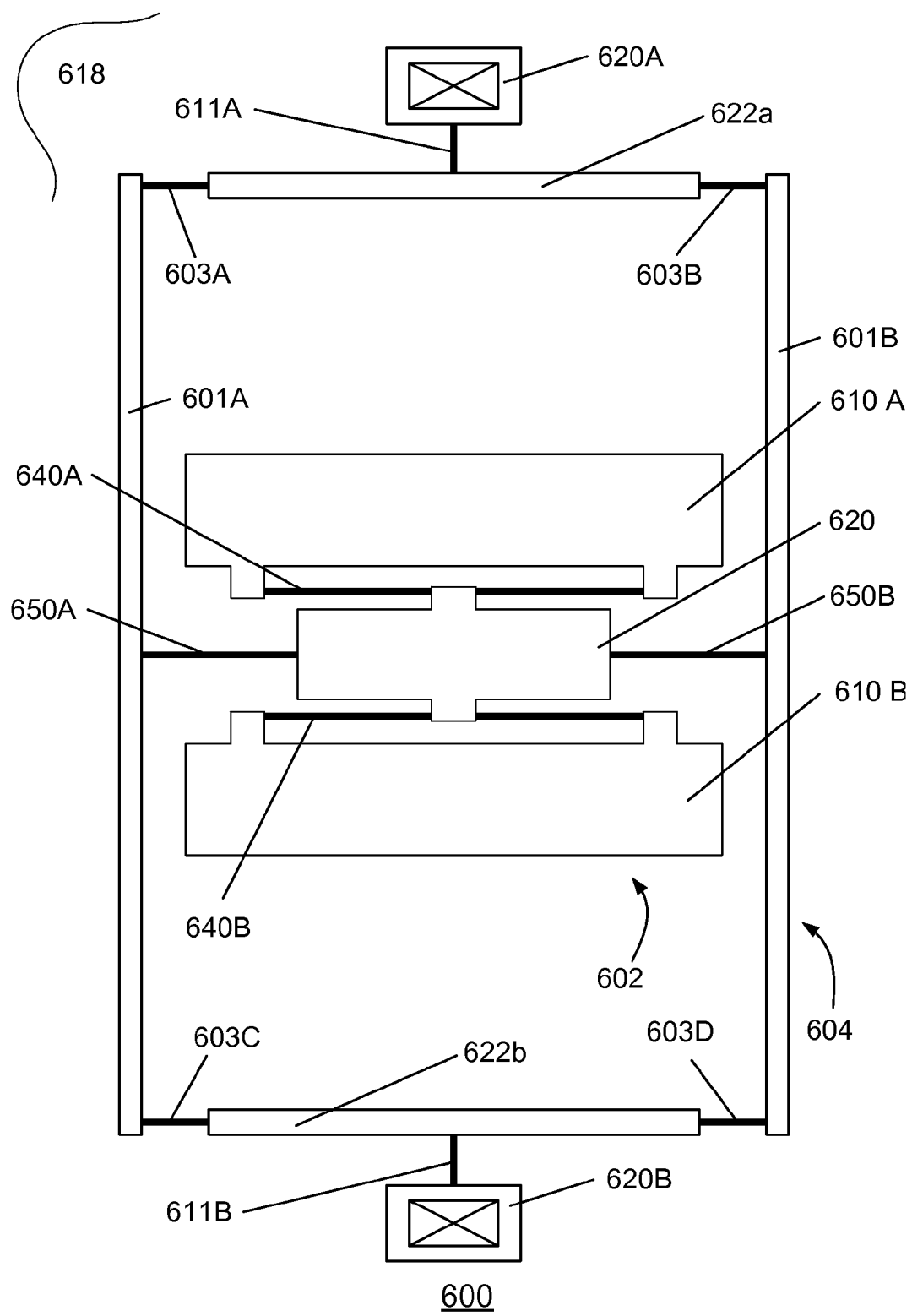
FIG. 6 shows generic angular velocity sensor with disclosed frame.

The disclosed sensing frame may be used for sensing the angular velocity with input axis laying in-plane with the sensing frame or with input axis laying out-of-plane with respect to the sensing frame. FIG. 6 depicts generic sensing subassembly 600 for detecting angular velocity around an in-plane and out-of-plane axes. Sensing subassembly comprises a drive subsystem 602 and a sense subsystem 604. Only proof masses 610A-B, transmission mass 620A-620B, and flexures 640A-640B of the drive system are shown. Sense subsystem 604 comprises the anchoring flexures 611A-B and a frame further comprising a first and second rails 601A and 601B and first and second guiding arms 622A and 622B flexibly coupled through the four frame flexures 603A-603D. Drive subsystem and the sense subsystem share coupling flexures 650A and 650B.

Figure 7:
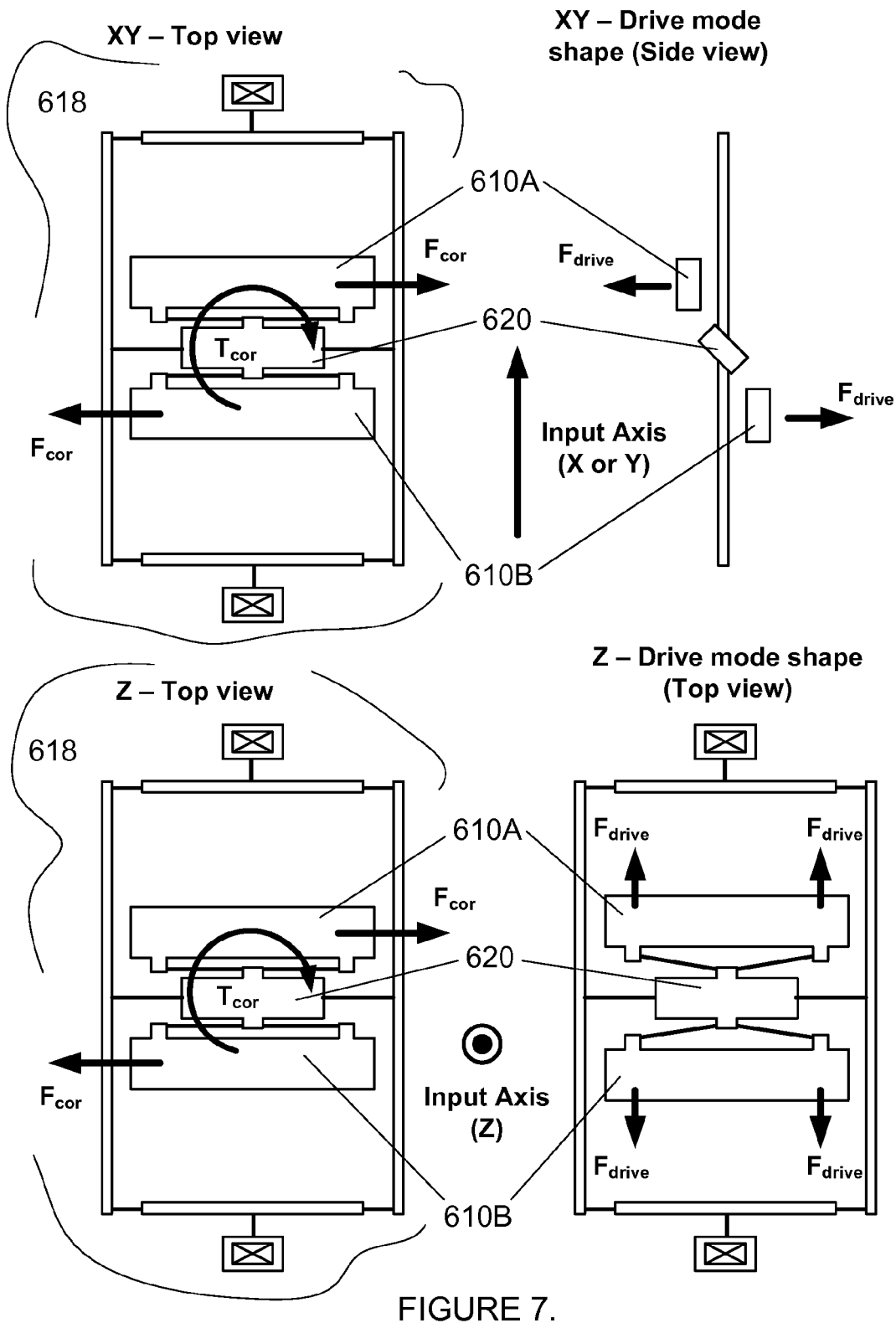
FIG. 7 shows top view and drive mode of the X and Z angular velocity sensing subassemblies.

FIG. 7 shows the way the drive subsystem from FIG. 6 may be driven into sustained oscillations at the frequency of the drive mode with an appropriate actuator. In one implementation, the drive subsystem may be designed such that the proof masses move out-of-plane in anti-phase fashion as depicted in FIG. 7A. If the base 618 rotates around input axis X, generated Coriolis force is in plane. Coriolis forces act in opposite fashion on proof masses 610A and 610B resulting in Coriolis torque acting on the mass 620. In one implementation, the input axis may be X axis. In another implementation, the input axis may be Y axis. In yet another implementation, the drive mode may comprise proof masses moving in anti-phase fashion in plane as depicted in the bottom part of FIG. 7B. If the base 618 rotates around input axis Z, the Coriolis force is generated in plane. Coriolis force acts in one direction on proof mass 610A and in the opposite direction on proof mass 610B resulting in Coriolis torque which eventually gets transferred on the mass 620. The resulting Coriolis torque on mass 620 is normal to the X-Y plane regardless whether input axis is X, Y or Z.

Figure 8:
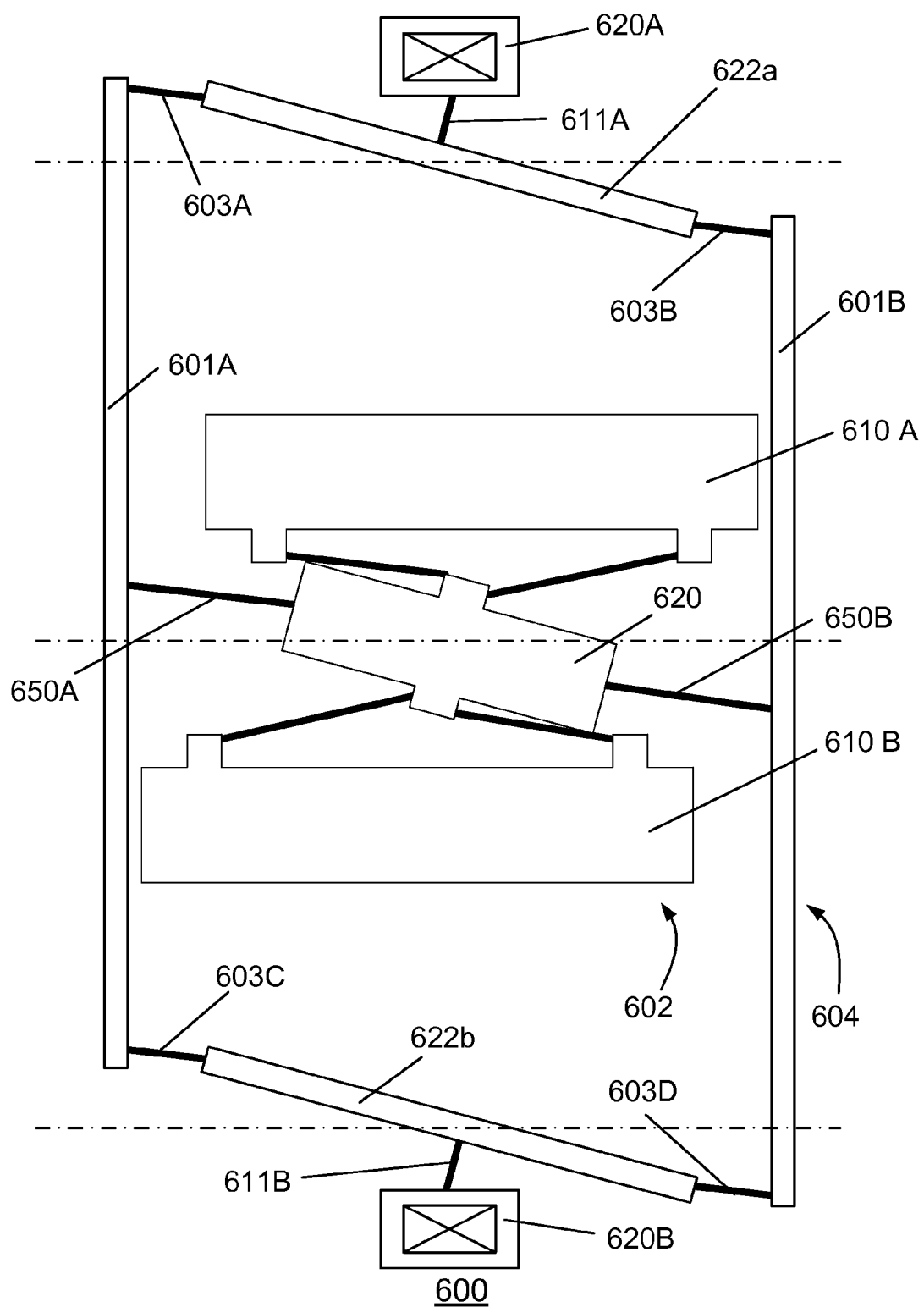
FIG. 8 shows mechanism of transferring the Coriolis torque to the sense subsystem.

FIG. 8 illustrates how the Coriolis torque acting on the drive subsystem 602 gets transferred to the sense subsystem 604. Rails 601A and 601B are flexibly connected to the center mass 620 through the pair of flexures 650 and are flexibly connected to the guiding arms 622A and 622B through the four frame flexures 603A-D. The flexures 603A-D allow the frame to deform. The guiding arms are suspended to the base 618 through the anchoring flexures 611A and 611B. Torque acting on the mass 620 causes opposite forces acting on rails 601A and 601B. Guiding arms 622A-622B can only rotate causing the ring to deform. Motion of the rails is proportional to the input angular rate of rotation. In one implementation the transducer may be attached to the rail so the motion of the rail can be detected.

The sensing frame inherently rejects linear acceleration along the in-plane axis parallel to the rails. Referring to FIG. 8, the sensing frame has two rails constrained to move in anti-phase fashion. This way it is ensured that there is no low frequency translational mode associated with motion of the sensing frame along the axis parallel to the rails. Consequently, any substantial motion caused by linear acceleration is mechanically rejected.

Figure 9:
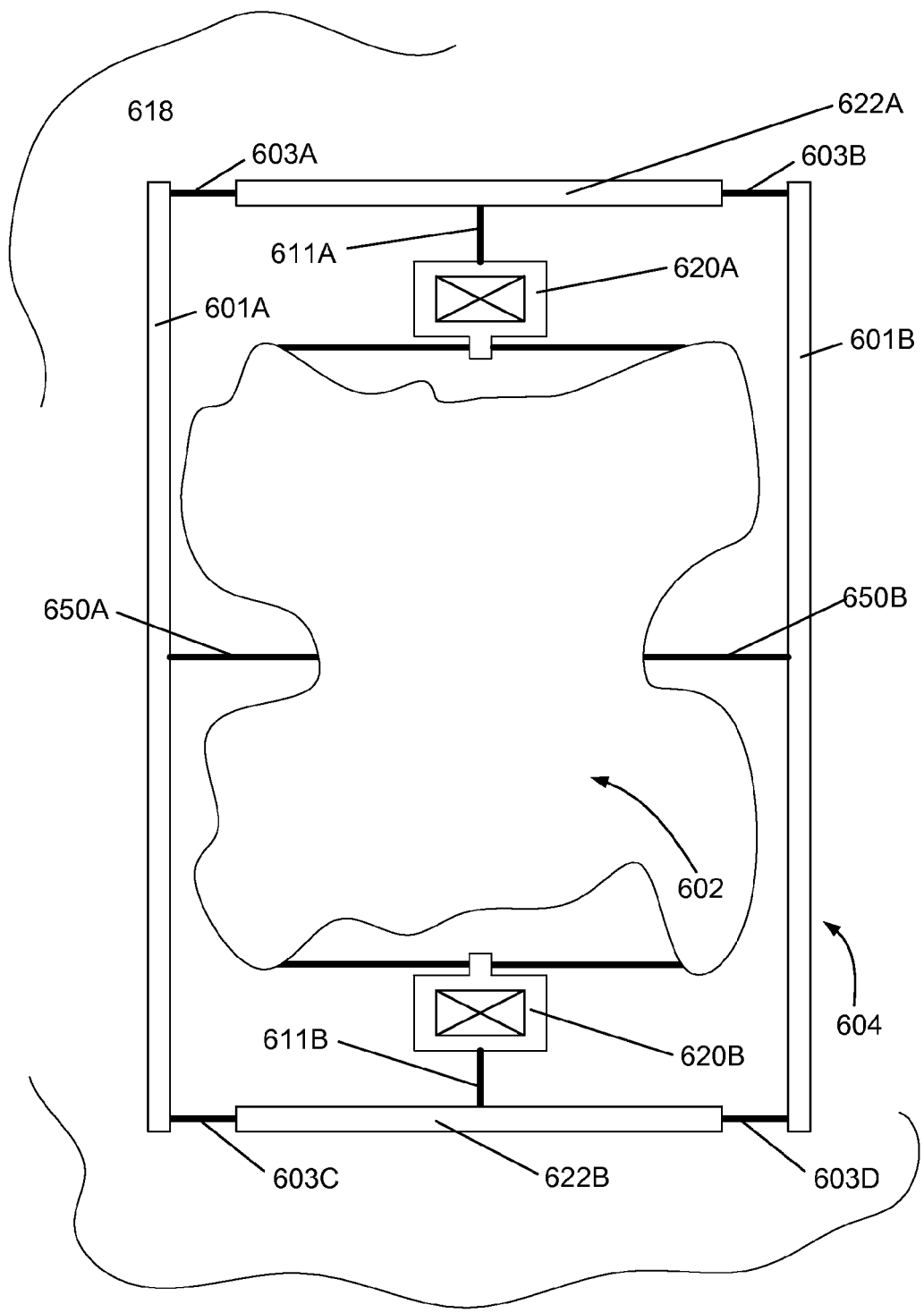
FIG. 9 shows the sense and the drive subsystems sharing the same pair of anchors.

The sensing frame needs to be suspended to the base at minimum of two points. These points provide pivot points for the guiding arms. As shown in FIG. 9, the drive subsystem may be suspended to the base 618 at two anchoring points as well. Two anchoring points may be shared by both drive and sense subsystems. This way, the whole angular velocity sensing subassembly relies on two anchoring point. Undesired effects of package stresses on mechanical structure is substantially reduced.

Figure 10:
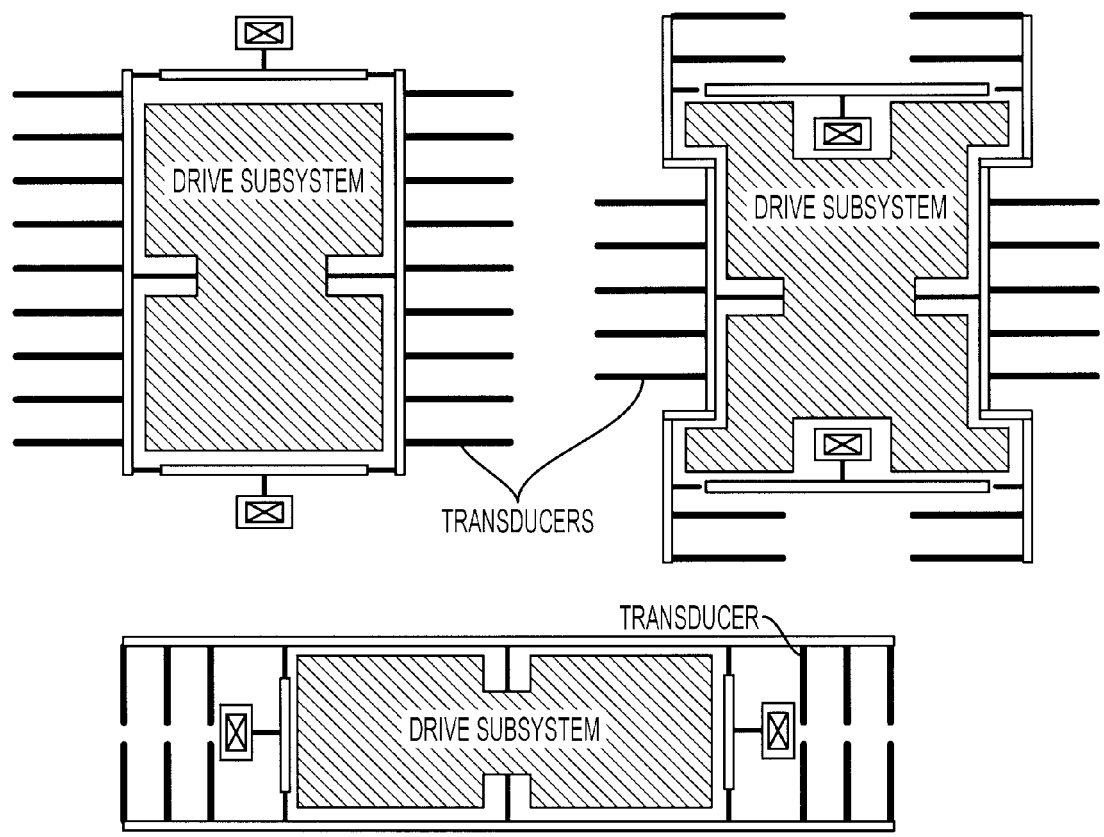
FIG. 10 illustrates flexibility of the design of the flexible frame with respect to its shape.

The rails and guiding arms may assume any shape as long as they are substantially stiff compared to flexures 603A-603D and flexures 611A-611B. Referring to FIG. 10, the sense frame can be shaped as needed without decreasing the performance of the angular velocity sensor. Typically, the drive subsystem may be optimized resulting in a particular shape. In order to minimize the sensor area, the optimized drive subsystem should be tightly enveloped with the sense frame. Circular, or even rigid rectangular frame may result in an unnecessary waste of area—first, the flexures suspending the sense subsystem to the substrate should be attached at a particular place at a particular angle, and second, the frame rotates so the attached transducers should lie along lines at angle such that their axial axes cross center of rotation. On the other hand, it is much easier to accommodate low-inertia flexible frame around that drive subsystem. Both rails and guiding arms can be any shape as long as they remain substantially rigid. The flexibility of the shape of the frame also allows such angular velocity sensor to fit into sensing assembly with other devices such as the other angular velocity sensors or linear acceleration sensors. Furthermore, the transducers can be attached to the rail in several different ways. FIG. 10 illustrates several different embodiments with different frame shape and transducer accommodation.

Figure 11:
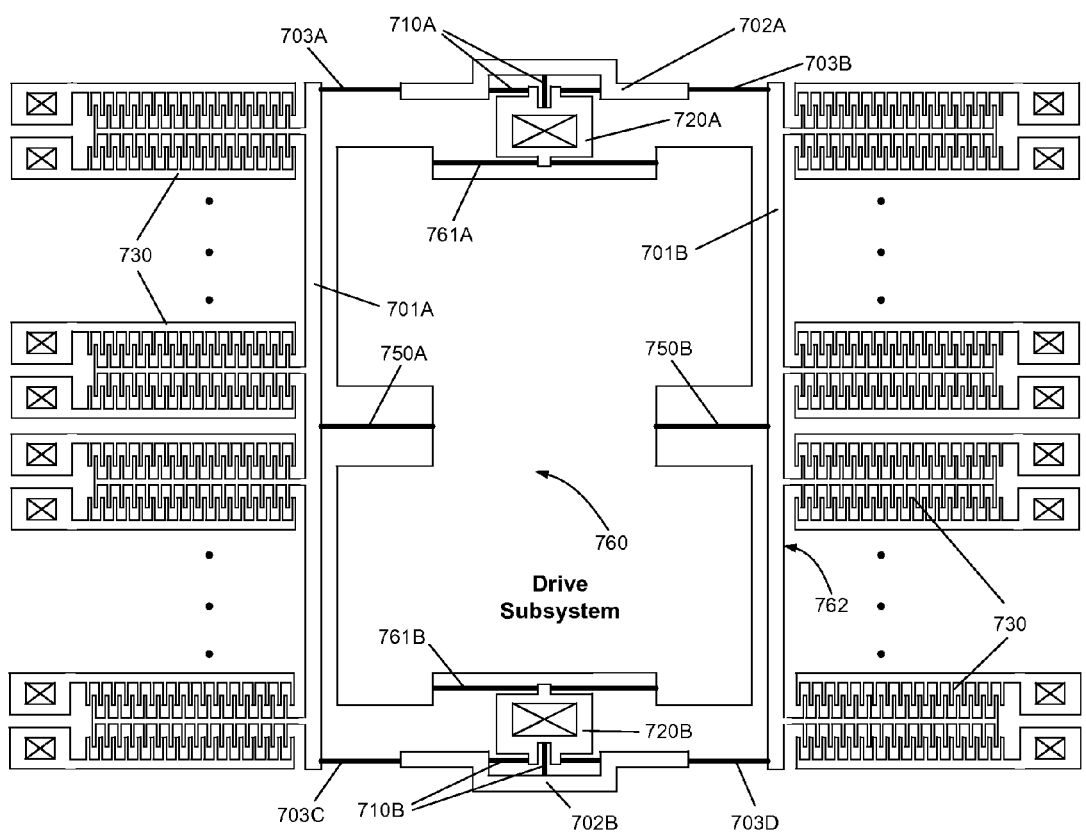
FIG. 11 shows a preferred embodiment wherein the movable part of the transducer faces outwards.

Referring to FIG. 11 an embodiment is shown with capacitive transducer 730 aligned along the rail with its movable portion pointing out from the drive subsystem 760. The anchoring flexures 710A and 710B comprise three beams each providing a pivot point for each of the guiding arms 702A and 702B. The anchoring flexures 710A and 710B also increases translational stiffness as well as and out-of-plane rotational stiffness. The guiding arms 702A and 702B are further connected to the rails 701A and 701B through the frame flexures 703A-703D. There are total of four frame flexures 703A-D comprising a single beam each. The frame flexures 703A-703D provide necessary flexibility of the frame. The whole frame assembly ensures that any torque generated on the drive subsystem 760 gets transferred to the sense system 762 through coupling flexures 750, and cause the rails 701A and 701B to move linearly in opposite directions. Further, the drive subsystem 760 is suspended to the base at the same anchor 720A and 720B as the guided arm. Joint anchoring reduces effects of package sensitivity by allowing the sense and drive system to move substantially similar as a result the stresses induced by the package.

Figure 12:
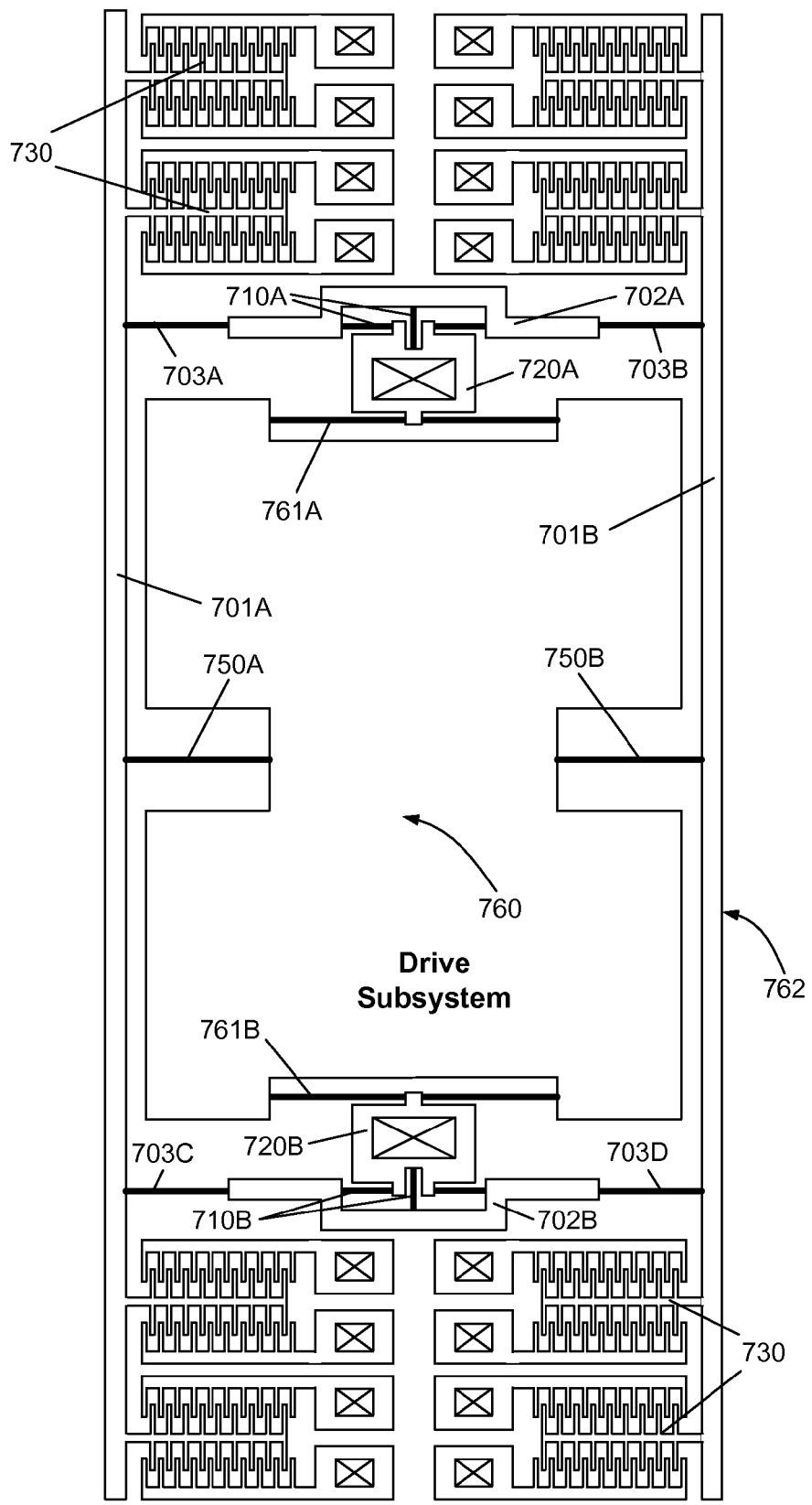
FIG. 12 shows a preferred embodiment wherein the movable part of the transducer faces inwards.

In yet another embodiment shown in FIG. 12, two rails are elongated so they can support capacitive transducers with its movable portion facing inwards. This way different configurations of the angular velocity sensors may be accommodated on multi-axis die. The teaching on frame and its flexures is essentially similar to that related to FIG. 11.

The shape of the rails 701A and 701B, guiding arms 702A and 702B, frame flexures 703A-703D and anchoring flexures 710A and 710B can differ from the shapes shown in FIG. 11 and FIG. 12, and still provide the same benefit as described above.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A gyroscope comprising:
   an oscillating proof mass for generating a torque in response to angular velocity;
   a sensing frame coupled to the oscillating proof mass, wherein the sensing frame moves in response to the torque, the sensing frame comprising: a base; a first rail; constrained to move along a first axis parallel to the base; a second rail substantially parallel to said first rail; said second rail constrained to move along the first axis; at least two guiding arms ensuring the first rail and the second rail to move in anti-phase fashion along the first axis; a first guiding arm flexibly coupled to the first rail and flexibly coupled to the second rail; a second guiding arm flexibly coupled to the first rail and flexibly coupled to the second rail; the first guiding arm flexibly suspended to the base at a first anchoring point allowing rotation of the first guiding arm around a second axis that is perpendicular to the first axis and normal to the plane; the second guiding arm suspended to the base at a second anchoring point allowing rotation of the second guiding arm around a third axis parallel to the second axis;
   a plurality of coupling flexures connecting said sensing frame to the oscillating proof mass; and
   a transducer for sensing motion of the rails along the first axis responsive to said angular velocity.

2. The gyroscope of claim 1
   comprising plurality of guiding arms; each guiding arm flexibly coupled to the first rail and each guiding arm flexibly coupled to the second rail;
   each guiding arm flexibly suspended to the base at an anchoring point allowing rotation of each guiding arm around axes in the plane including the second and third axes.

3. The gyroscope of claim 1 wherein said plurality of coupling flexures connecting said oscillating proof mass and said sensing frame, connect said oscillating proof mass to said first rail and said second rail.

4. The gyroscope of claim 1 wherein said plurality of coupling flexures connecting said oscillating proof mass and said sensing frame, connect said oscillating proof mass to said first and said second guiding arm.

5. The gyroscope of claim 1 wherein:
   said first anchoring point is shared with at least one anchoring point of the oscillating proof mass; and said second anchoring point is shared with at least one anchoring point of the oscillating proof mass.

6. The gyroscope of claim 1 wherein said first rail and said second rail support movable part of said transducer.

7. The gyroscope of claim 1 wherein said transducer is selected from the group consisting of capacitive sensors, electromagnetic sensors, piezoelectric sensors, and piezoresistive sensors.

* * * * *